(12) United States Patent
Liu et al.

(10) Patent No.: US 8,178,383 B2
(45) Date of Patent: May 15, 2012

(54) TOUCH-SENSING DISPLAY DEVICE AND METHOD FOR MANUFACTURING THE SAME

(75) Inventors: Po-Yuan Liu, Hsin-Chu (TW);
Ming-Sheng Lai, Hsin-Chu (TW);
Chun-Hsin Liu, Hsin-Chu (TW);
Kun-Hua Tsai, Hsin-Chu (TW)

(73) Assignee: AU Optronics Corp. (TW)

( * ) Notice: Subject to any disclaimer, the term of this patent is extended or adjusted under 35 U.S.C. 154(b) by 883 days.

(21) Appl. No.: 12/232,846

(22) Filed: Sep. 25, 2008

(65) Prior Publication Data
US 2009/0096767 A1  Apr. 16, 2009

(30) Foreign Application Priority Data
Oct. 12, 2007  (TW) ............................... 96138186 A

(51) Int. Cl.
*H01L 21/00* (2006.01)
(52) U.S. Cl. .................................. 438/70; 257/E21.535
(58) Field of Classification Search .................... 438/70; 257/E21.535
See application file for complete search history.

(56) References Cited

U.S. PATENT DOCUMENTS

| 6,057,903 | A | * | 5/2000 | Colgan et al. ................. 349/139 |
| 6,839,116 | B2 | * | 1/2005 | Hong et al. .................... 349/141 |
| 7,459,726 | B2 | * | 12/2008 | Kato et al. ...................... 438/69 |

* cited by examiner

*Primary Examiner* — Chandra Chaudhari
(74) *Attorney, Agent, or Firm* — Bacon & Thomas, PLLC

(57) ABSTRACT

A display device and method for manufacturing the same are disclosed. The display device includes a first substrate, a second substrate, a touch-sensing element, and a liquid crystal. The first substrate has a first surface and a second surface thereon. The second substrate has a pixel array and is disposed on the second surface of the first substrate. The touch-sensing element locates on the first surface of the first substrate. Furthermore, the touch-sensing element includes a conductive layer, a patterned electrode, and a passivation layer. The patterned electrode is correspondingly located on the periphery of the first substrate, and electrically connected to the conductive layer. The passivation layer covers the conductive layer and the patterned electrode. In addition, the liquid crystal is disposed between the first substrate and the second substrate.

9 Claims, 10 Drawing Sheets

TOUCH-SENSING DISPLAY DEVICE AND METHOD FOR MANUFACTURING THE SAME

BACKGROUND OF THE INVENTION

1. Field of the Invention

The present invention relates to a touch panel display device, and more particularly relates to a light and slim touch panel display device.

2. Description of Related Art

Touch panel display devices, in which the information data is input by touching with fingers or styli on the display area, are extensively used in personal computers, notebooks, personal digital assistants (PDAs), or other similar devices.

A conventional touch panel display device comprises a display panel and a touch screen attached to the display panel. The touch screen can include at least four technologies, including: capacitive, resistive, surface acoustic wave (SAW), and infrared (optical). As for the general touch screens located in public applications, a capacitive touch screen is often used. With reference to FIG. 1, a conventional touch panel display device is represented, wherein a touch panel display device comprises: a display panel 10 and a touch screen 20. The display panel 10 comprises a CF substrate (color filter substrate) 11, a TFT substrate (thin film transistor substrate) 12, and a LC (liquid crystal) 13 locating between the CF substrate 11 and the TFT substrate 12. A black matrix 111, a plurality of color filter blocks 112, and a transparent electrode layer 113 are located on one side (surface), facing to the TFT substrate 12, of the CF substrate. A polarizing element 114 is located on the other side of the CF substrate. Besides, a touch screen 20 is located next to the polarizing element 114. Herein, the touch screen 20 comprises a substrate 21, and a first conductive layer 22 is selectively formed on one surface of the substrate 21. Then, a second conductive layer 23, a patterned electrode 24, and a passivation layer 25 are sequentially formed on the other surface of the substrate 21. The patterned electrode 24 is located on the periphery of the substrate 21 and electrically connected to the second conductive layer 23, and the passivation layer 25 covers the second conductive layer 23 and the patterned electrode 24. Herein, the substrate 21 may be a glass substrate, and each of the first conductive layer 22 and the second conductive layer 23 may be an ITO (indium tin oxide) layer. Finally, a touch screen 20 is formed on the polarizing element 114 locating on the CF substrate 11, thus a conventional touch panel display device is obtained.

However, in such device having a touch screen on one surface of the display panel, the total weight and total thickness thereof are too great, and is difficult to produce a light and slim touch panel display device. Moreover, the adding of an extra touch screen will decrease the transmittance and lower the brightness of the LCD. Also, the adding of a touch screen on the display panel will increase the cost of the manufacture.

SUMMARY OF THE INVENTION

Therefore, the present invention provides a display device, comprising: a first substrate, a second substrate, a touch-sensing element, and a liquid crystal. The first substrate has a first surface and a second surface. The second substrate having a pixel array is correspondingly located on the second surface of the first substrate. The touch-sensing element locating on the first surface of the first substrate comprises: a conductive layer, a patterned electrode, and a passivation layer, wherein the patterned electrode is correspondingly located on the periphery of the first substrate and electrically connected to the conductive layer, and the passivation layer covers the conductive layer and the patterned electrode. The liquid crystal disposes between the first and the second substrate.

The above display device of the present invention may further comprise a color filter forming on the second surface of the first substrate.

The above display device of the present invention may further comprise a polarizing element locating on a surface of the passivation layer. The polarizing element may be the polarizer film made of such as polymer, etc.

The above passivation layer of the present invention may be made of a polarizing material to polarize light.

According to the above display device of the present invention, the conductive layer may locate on the first surface of the first substrate, and a portion of the patterned electrode may locate on the conductive layer. Alternatively, the patterned electrode may contact with the first surface of the first substrate, and the conductive layer may cover a portion of the patterned electrode.

The present invention also provides another display device, which comprises: a first substrate, a second substrate, a polarizing element, a touch-sensing element, and a liquid crystal. The first substrate has a first surface and a second surface. The second substrate having a pixel array is correspondingly located on the second surface of the first substrate. The polarizing element locates on the first surface of the first substrate. The touch-sensing element locating on the first surface of the first substrate comprises: a conductive layer, a patterned electrode, and a passivation layer, wherein the patterned electrode is correspondingly located on the periphery of the first substrate and electrically connected to the conductive layer, and the passivation layer covers the conductive layer and the patterned electrode. The liquid crystal disposes between the first and the second substrate.

The display device of the present invention may further comprise a color filter forming on the second surface of the first substrate.

According to the display device of the present invention, the passivation layer may be made of a polarizing material in order to polarize light.

According to the display device of the present invention, the passivation layer may be preferably made of a silicon oxide, a silicon nitride, a polymer, etc.

According to the display device of the present invention, the conductive layer may locate on the polarizing element, and a portion of the patterned electrode may locate on the conductive layer. Alternatively, the patterned electrode may contact with the polarizing element, and the conductive layer may cover a portion of the patterned electrode.

Herein, the conductive layer may be made of transparent conductive oxide (TCO), for example, antimony tin oxide (ATO), aluminum zinc oxide (AZO), indium tin oxide (ITO), indium zinc oxide (IZO), or zinc oxide.

The first substrate and the second substrate of the present invention are not limited but preferably are glass substrates.

For example, the above display device of the present invention can be provided from the following steps:

First, a first substrate having a first surface and a second surface is provided. Then, a touch-sensing element is formed on the first surface of the first substrate, wherein the steps of forming the touch-sensing element comprise: (a) forming a conductive layer and a patterned electrode which locates correspondingly on the periphery of the first substrate; then (b) forming a passivation layer covering the conductive layer and the patterned electrode; and (c) forming a color filter on the second surface of the first substrate.

Afterwards, a second substrate having a pixel array is provided correspondingly on the second surface of the first substrate. Finally, a liquid crystal is deposited in between the first and the second substrate.

The method of fabricating a display device of the present invention may further comprise an annealing process after the touch-sensing element has been formed on the first surface of the first substrate.

According to the method of the present invention, a plurality of through holes may be formed in the passivation layer to expose the patterned electrodes as terminals after the step (b).

According to the method of the present invention, the patterned black matrix may be formed on the second surface of the first substrate in the step (c), but is not limited thereto.

According to the method of the present invention, the method of providing a color filter on the second surface of the first substrate comprises: forming a patterned black matrix and a plurality of color filter blocks on the second surface of the first substrate sequentially. Then, a transparent electrode layer is formed on the surfaces of the color filter.

According to the method of the present invention, a polarizing element may further attach to the passivation layer, but is not limited thereto.

According to the method of the present invention, the steps of forming the touch-sensing element on the first surface of the first substrate comprise: (a) forming a conductive layer on the first surface of the first substrate; then (b) forming a patterned electrode, in which the patterned electrode locates correspondingly on the periphery of the first substrate and a portion of the patterned electrode on the conductive layer; and then (c) forming a passivation layer to cover the conductive layer and the patterned electrode.

Alternatively, the steps of forming the touch-sensing element on the first surface of the first substrate may be: (a) forming a patterned electrode on the first surface of the first substrate, in which the patterned electrode locates correspondingly on the periphery of the first substrate; then (b) forming a conductive layer on the first surface of the first substrate to cover a portion of the patterned electrode; and then (c) forming a passivation layer to cover the conductive layer and the patterned electrode.

In an embodiment of the present invention, the touch-sensing element forms directly on the surface of the first substrate, and thus is capable of providing the first substrate with touch-sensing functions. Besides, the passivation layer may possess protective and polarizing functions at the same time.

In another embodiment of the present invention, a polarizing element is first formed on one surface of the first substrate, and then a touch-sensing element is formed to give the touch-sensing function.

In another embodiment of the present invention, the conductive layer of the touch-sensing element may be a patterned conductive layer, but is not limited thereto.

Hence, the display device of the present invention, which has a touch-sensing element integrated in (or assembled with) the first substrate, can be manufactured with low cost, and the display device obtained according to the present method has the advantages of being highly transparent, light and slim.

Other objects, advantages, and novel features of the invention will become more apparent from the following detailed description when taken in conjunction with the accompanying drawings.

DETAILED DESCRIPTION OF THE PREFERRED EMBODIMENT

Hereinafter, the present invention will be described in further detail with reference to examples and comparative examples. Although the preferred embodiment of the present invention has been described for illustrative purposes, those skilled in the art will appreciate that various modifications, additions and substitutions are possible, without departing from the scope and spirit of the invention as disclosed in the accompanying claims.

The drawings are simplified, and only the elements shown are for description and are not for practice regarding the numbers and shapes thereof.

Example 1

Referring to both FIGS. 2 and 3, wherein a schematic view of a display device and a process flow chart of the first substrate are shown respectively, the method of providing a display device of the present example is described below.

First, a first substrate 30 having a first surface 30a and a second surface 30b is provided. Herein, the first substrate 30 can be a glass substrate.

Figure 4:
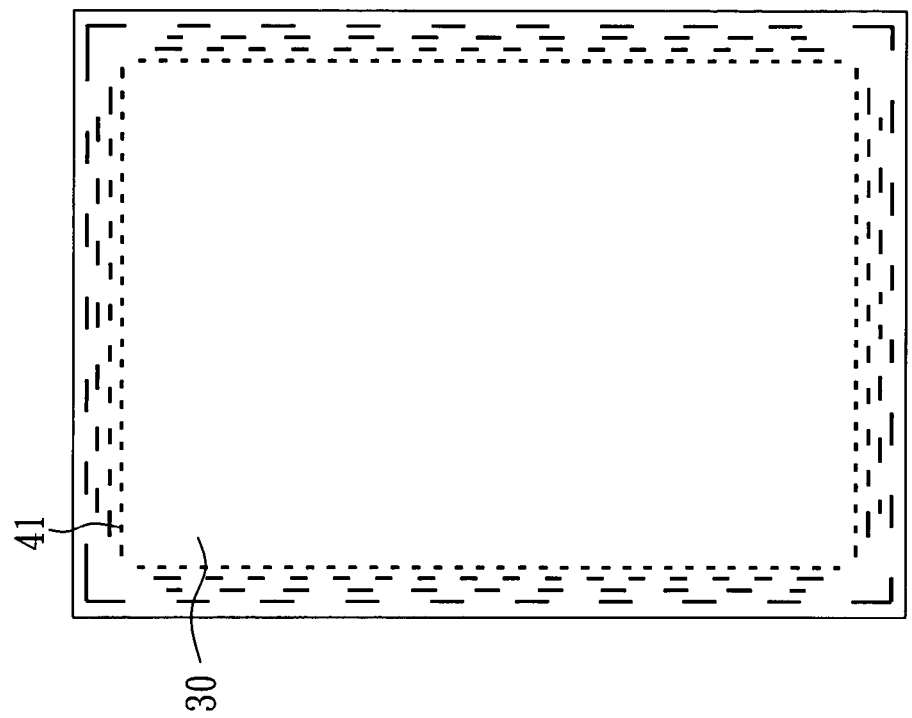
FIG. 4 is a schematic view showing a patterned electrode formed on the first substrate according to a preferred embodiment of the present invention.

Then, a touch-sensing element 40 is formed on the first surface 30a of the first substrate 30, wherein the steps of forming the touch-sensing element 40 comprise: forming a patterned electrode 41 on the first surface 30a of the first substrate 30, in which the electrode layer 41 may be made of molybdenum/aluminum (Mo/Al) (Al formed before the formation of Mo) or Mo/Al/Mo (Mo formed first, following with Al, and then Mo formed at last). Herein, the patterned electrode 41 locates correspondingly on the periphery of the first substrate 30, as shown in FIG. 4. However, the tracing line and the bonding pad connecting outward are not shown here. Next, a conductive layer 42 is formed on the first surface 30a of the first substrate 30 and on a portion of the patterned electrode 41. The conductive layer 42 may be made of transparent conductive oxide, such as antimony tin oxide (ATO), aluminum zinc oxide (AZO), indium tin oxide (ITO), indium zinc oxide (IZO), or zinc oxide, wherein the conductive layer 42 in the present example is an ITO layer. A passivation layer 43 is then deposited on the conductive layer 42. The passivation layer 43 here may be an inorganic layer made of silicon nitride (SiNx) or silicon oxide (SiOx), an organic layer made of polymer or organic material, or a combination layer thereof, but is not limited thereto. A plurality of through holes (not shown) are formed in the edge of the passivation layer 43 to expose the patterned electrodes as terminals. Afterwards, the first substrate 30 is placed into an oven to perform an annealing process after the formation of the passivation layer 43.

Then, a color filter is then formed on the second surface 30b of the first substrate 30. The color filter may be formed by the following steps: a patterned black matrix 31 is formed on the second surface 30b of the first substrate 30, and a plurality of color filter blocks 32 are formed on the black matrix 31 to form the color filter, but not limited herein. Wherein, the color filter blocks 32 can be distinguished into three colors: red (R), green (G), and blue (B). A transparent electrode layer 33 may be provided on the color filter after the formation of the color filter (on the second surface 30b of the first substrate 30). The transparent electrode layer 33 can be made using any material that is used in the conductive layer 42. In the present example, ITO is used to provide the transparent electrode layer 33. Consequently, the first substrate 30 having a touch-sensing element 40 is formed.

Figure 1:
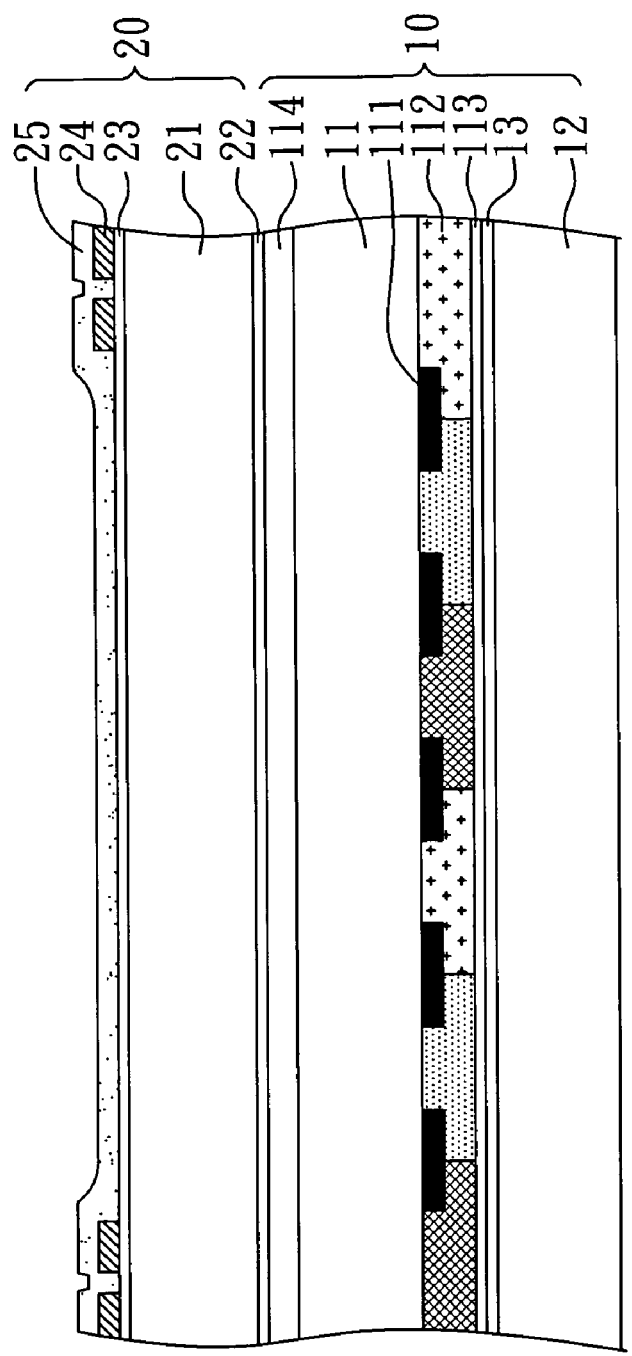
FIG. 1 is a schematic view of a conventional touch panel display device.
Figure 2:
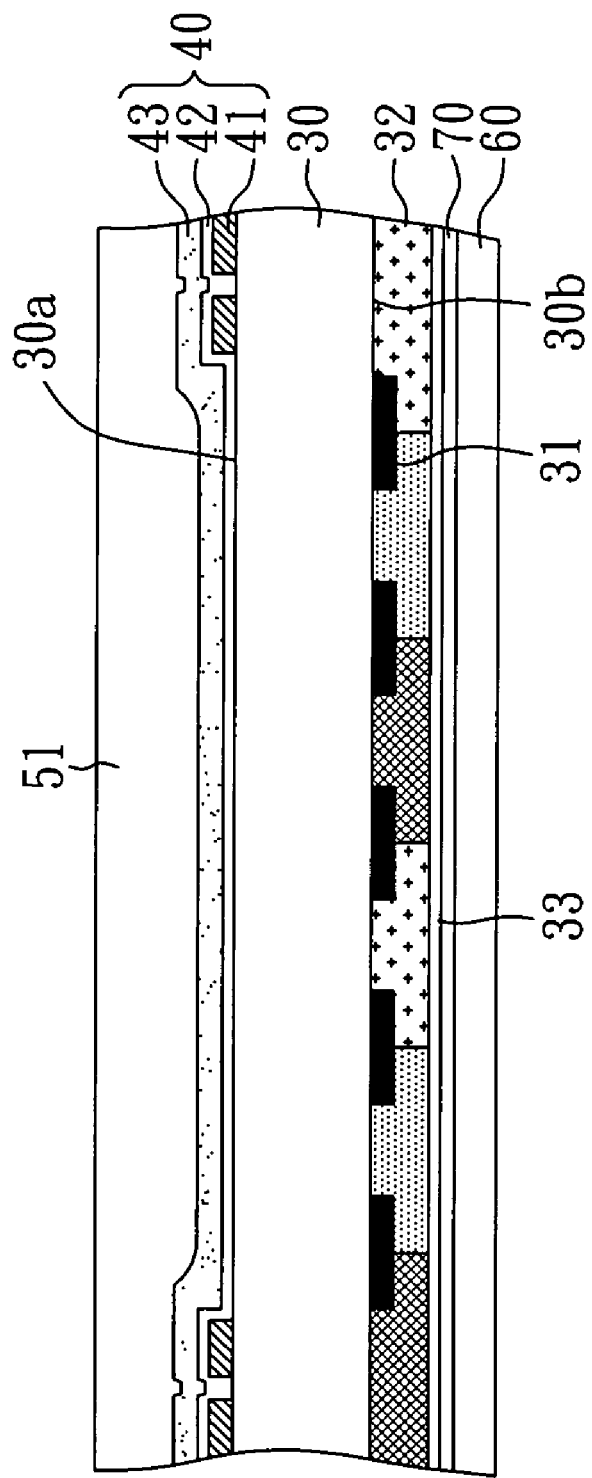
FIG. 2 is a schematic view of a display device of a preferred embodiment of the present invention.
Figure 3:
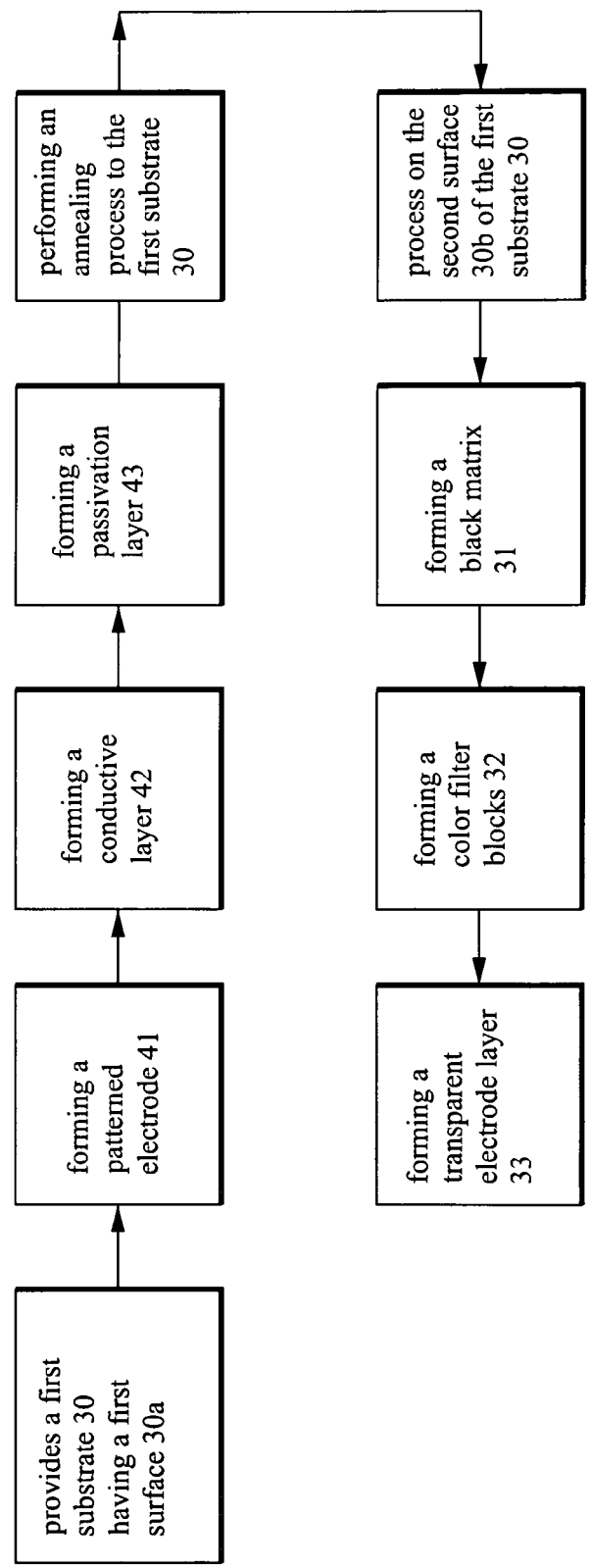
FIG. 3 is a schematic flow chart showing a process of the first substrate of a preferred embodiment.

Moreover, a polarizing element 51, such as a polarizer film made of polymer, may be provided on the passivation layer 43 of the first surface 30a of the first substrate 30 in the present example, as shown in FIG. 2.

Figure 5:
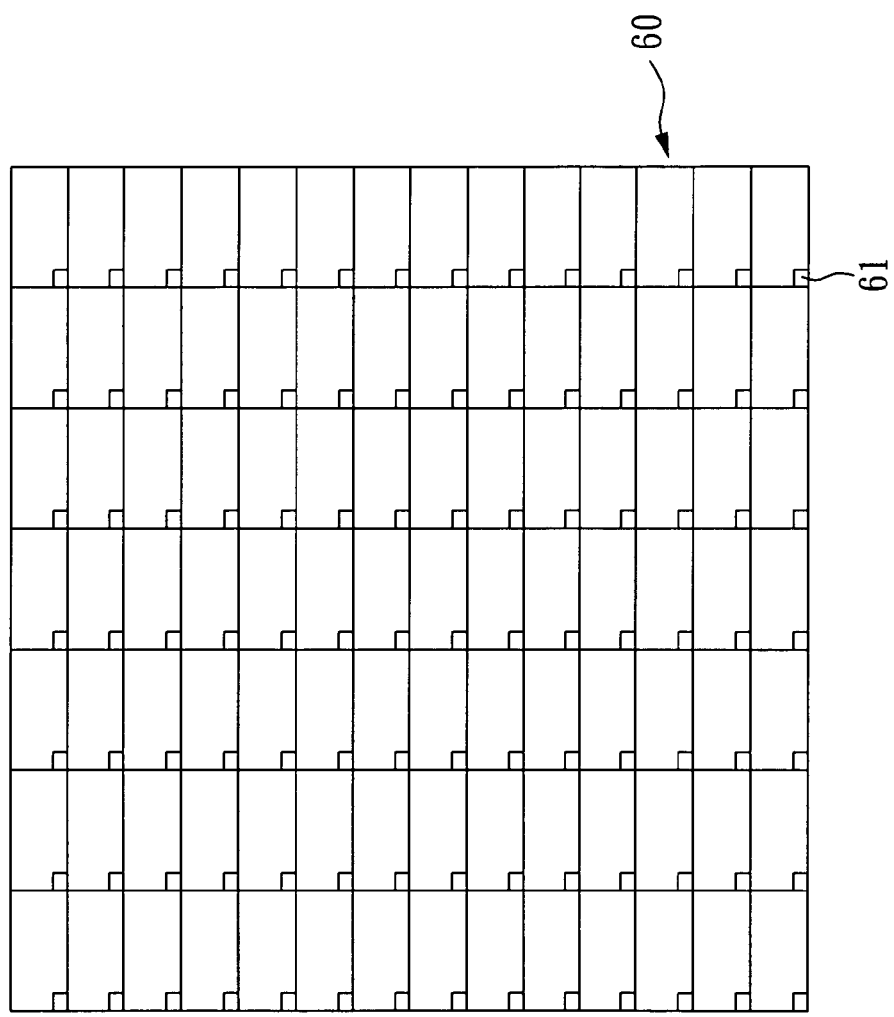
FIG. 5 is a schematic view of a second substrate according to a preferred embodiment of the present invention.

After the completion of the above steps, the first substrate 30 having a touch-sensing element 40 with the second substrate 60 is assembled, and a liquid crystal 70 is deposited in between them. Referring to FIG. 5, an upper view of a second substrate 60 of the present example is shown, wherein a second substrate 60 having a pixel array 61 with a plurality of pixel elements correspondingly locates on the second surface 30b of the first substrate 30 (FIG. 2). Therefore, a slim touch-sensing display device is thus formed.

Example 2

Figure 6:
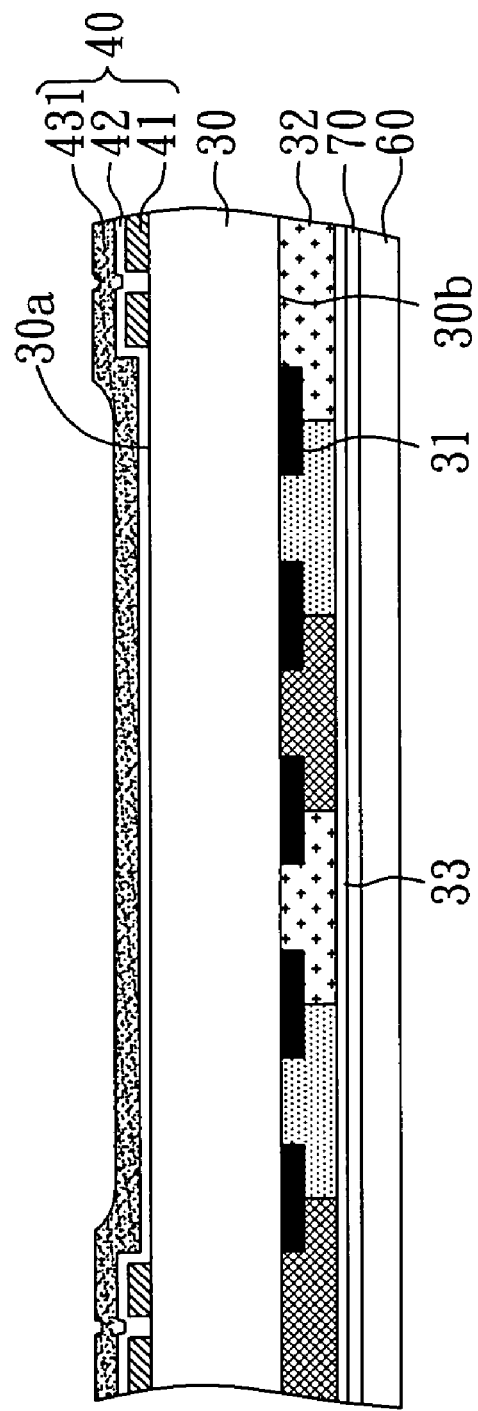
FIG. 6 is a schematic view of a display device of another preferred embodiment of the present invention.

This is the same method as in Example 1, except that a polarizing material or a polarizing element, which is able to polarize lights, is directly used to replace the silicon nitride (SiNx) to form the passivation layer 431 on the conductive layer 42 and on the patterned electrode 41 of the present example (as shown in FIG. 6). Thereby, the passivation layer 431 of the present example is able to possess the polarizing function (the same as that of the polarizing element 51, as shown in FIG. 2) and passivation function at the same time. Hence, there is no excess need of attaching the polarizing element 51 (as shown in FIG. 2). Other steps are the same as those of Example 1 to produce a display device.

Example 3

Figure 7:
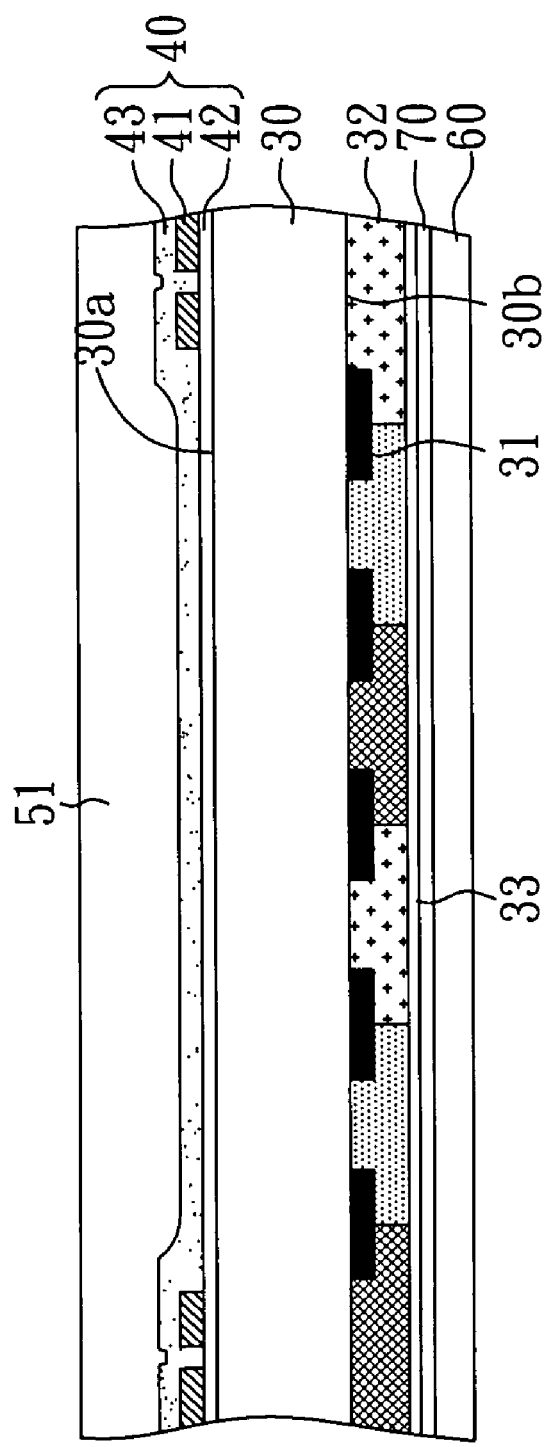
FIG. 7 is a schematic view of a display device of further another preferred embodiment of the present invention.
Figure 8:
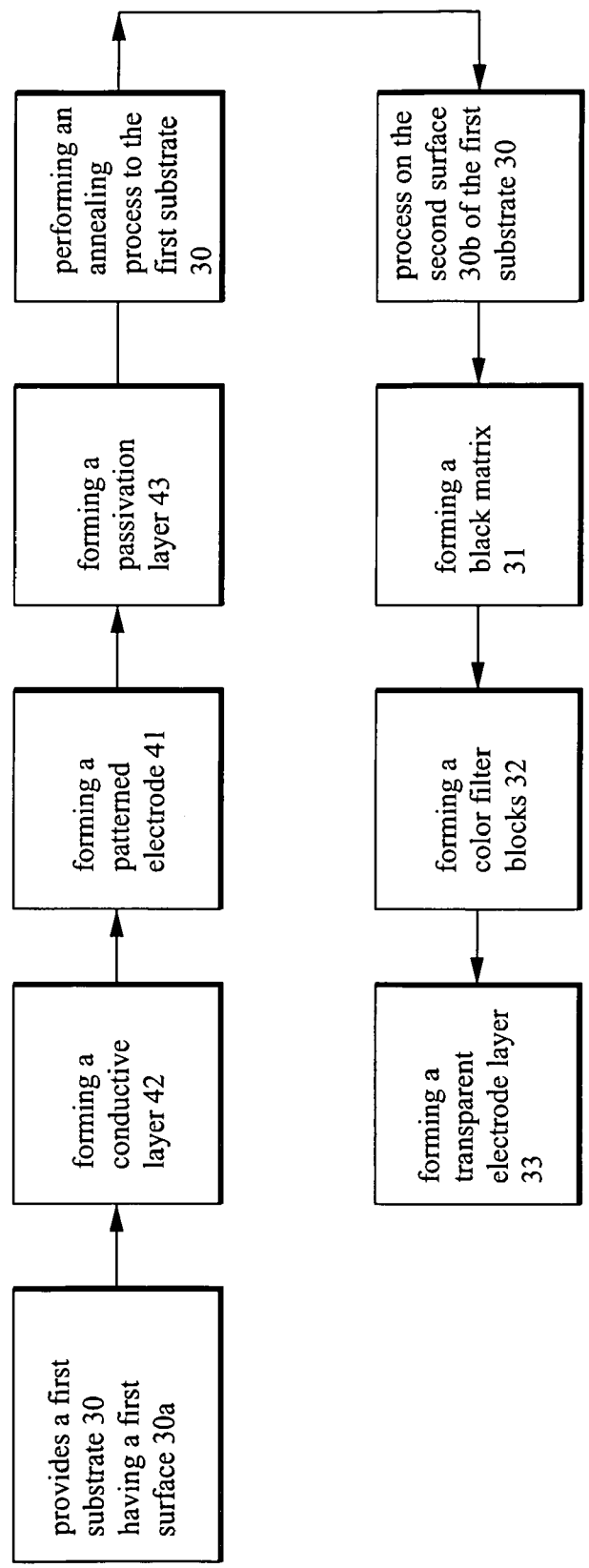
FIG. 8 is a schematic flow chart showing a process of the first substrate of a display device shown in FIG. 7.

With reference to FIGS. 7 and 8, the method of fabricating a display device here is the same as that of Example 1, except that the conductive layer 42 is firstly formed on the first surface 30a of the first substrate 30, then the formation of the patterned electrode 41 electrically connected to the conductive layer 42 follows when producing the touch-sensing element 40. The electrode layer 41 may be made of Al/Mo (Al formed after the formation of Mo) or Mo/Al/Mo (Mo formed first, following with Al, and then Mo formed at last). The patterned electrode 41 locates correspondingly on the periphery of the first substrate 30, and the layout of the patterned electrode 41 may be the same as that in Example 1. Other steps are the same as those of Example 1 to produce a display device.

Example 4

Figure 9:
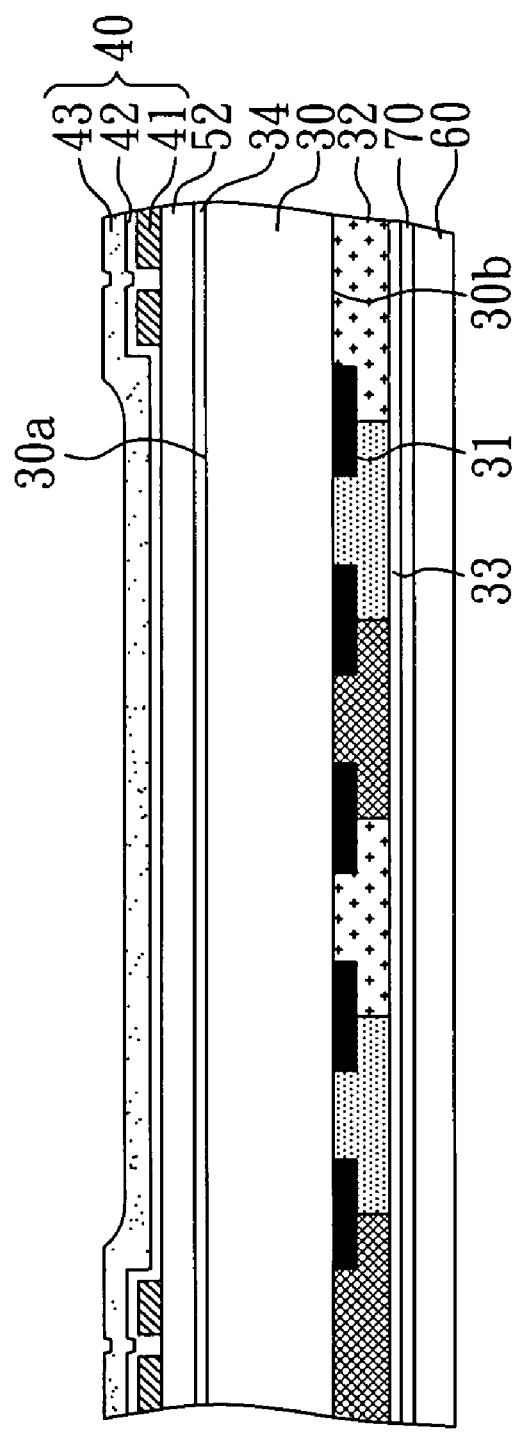
FIGS. 9 and 10 are display devices of other preferred embodiments of the present invention.

With reference to FIG. 9, the method of fabricating a display device here is the same as that of Example 1, except that the polarizing element 52 is firstly formed on the first surface 30a of the first substrate 30. Wherein, before the formation of the polarizing element 52, a conductive layer 34 can be selectively formed as a shielding to avoid some electrical interference. After that, a touch-sensing element 40 is formed. The method of forming the touch-sensing element 40 is the same as that in Example 1. Other steps of producing a display device are the same as those of Example 1.

Example 5

Figure 10:
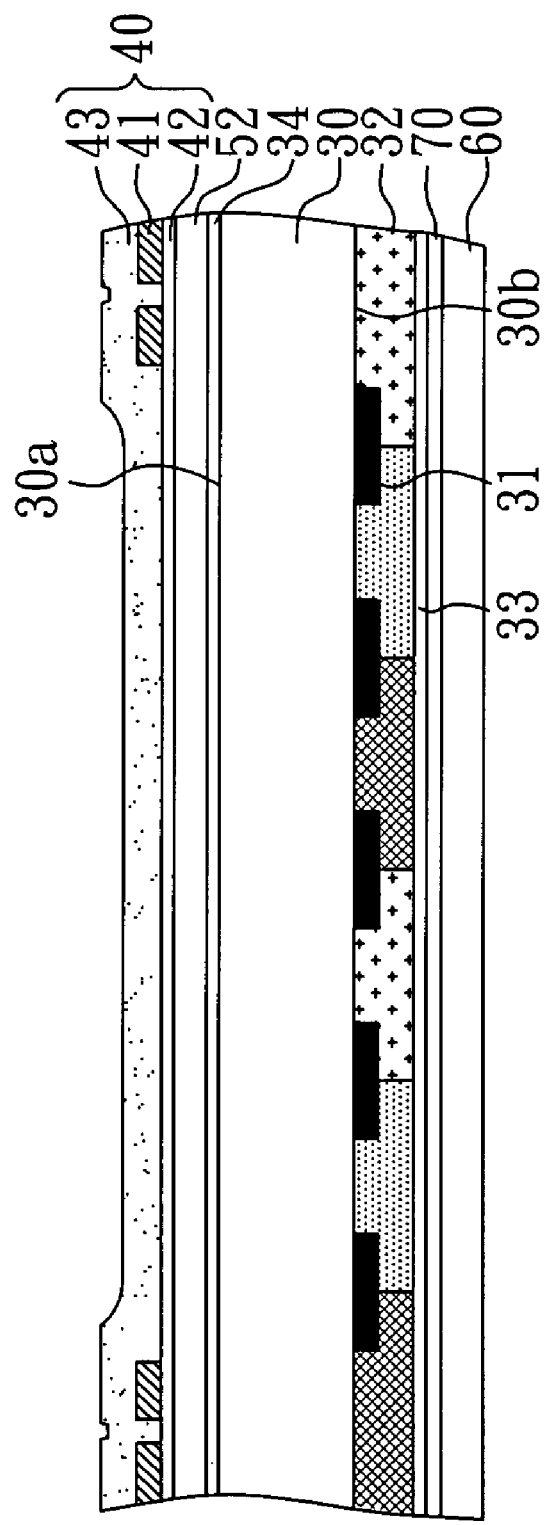

With reference to FIG. 10, the method of fabricating a display device here is the same as that of Example 1, except that the conductive layer 42 is firstly formed on the surface of the polarizing element 52, then a patterned electrode 41 is formed to electrically connect to the conductive layer 42. The patterned electrode 41 locates correspondingly on the periphery of the first substrate 30, and the layout of the patterned electrode 41 may be the same as that in the Example 2. Other steps are the same as those of Example 1 for producing a display device.

As mentioned above, the touch-sensing element (having touch-sensing functions) of the present invention is integrated in (or assembled with) the first substrate (i.e. CF substrate), thus eliminating the step of adding an extra touch screen on the CF substrate, and reducing the total weight and thickness of the conventional touch panel display device which cannot approach the demands of being light and slim. Also, the brightness of the LCD can be improved along with the increase of transmittance. Moreover, the target of cost-down manufacturing is easily achieved in the present invention, which has been an inevasible target for the conventional touch panel display device.

Although the present invention has been explained in relation to its preferred embodiment, it is to be understood that many other possible modifications and variations can be made without departing from the scope of the invention as hereinafter claimed.

What is claimed is:

1. A method of fabricating a display device, comprising:
providing a first substrate having a first surface and a second surface;
forming a touch-sensing element on the first surface of the first substrate, wherein the steps of forming the touch-sensing element comprise: (a) forming a conductive layer, and a patterned electrode which locate correspondingly on the periphery of the first substrate, wherein the patterned electrode electrically connected to the conductive layer; (b) forming a passivation layer covering the conductive layer and the patterned electrode; and (c) forming a color filter on the second surface of the first substrate;
providing a second substrate, having a pixel array, correspondingly locating on the second surface of the first substrate; and
filling a liquid crystal in between the first substrate and the second substrate.

2. The method as claimed in claim 1, further comprising a step of forming a plurality of through holes in the passivation layer to expose the patterned electrodes as terminals after the step (b).

3. The method as claimed in claim 1, further comprising an annealing process after the touch-sensing element is formed on the first surface of the first substrate.

4. The method as claimed in claim 1, wherein a patterned black matrix is formed on the second surface of the first substrate in the step (c).

5. The method as claimed in claim 4, wherein a transparent electrode layer is formed on the color filter after the step (c).

6. The method as claimed in claim 1, further comprising a step: attaching a polarizing element on the passivation layer.

7. The method as claimed in claim 1, wherein the step of forming the touch-sensing element comprises:
   forming a conductive layer on the first surface of the first substrate;
   forming a patterned electrode correspondingly located on the periphery of the first substrate and a portion of the patterned electrode on the conductive layer; and
   forming a passivation layer to cover the conductive layer and the patterned electrode.

8. The method as claimed in claim 1, wherein the step of forming the touch-sensing element comprises:
   forming a patterned electrode on the first surface of the first substrate and correspondingly located on the periphery of the first substrate;
   forming a conductive layer on the first surface of the first substrate and to cover a portion of the patterned electrode; and
   forming a passivation layer to cover the conductive layer and the patterned electrode.

9. The method as claimed in claim 1, wherein a material of the conductive layer comprises: antimony tin oxide (ATO), aluminum zinc oxide (AZO), indium tin oxide (ITO), indium zinc oxide (IZO), or zinc oxide.

* * * * *